United States Patent Office 3,621,638
Patented Nov. 23, 1971

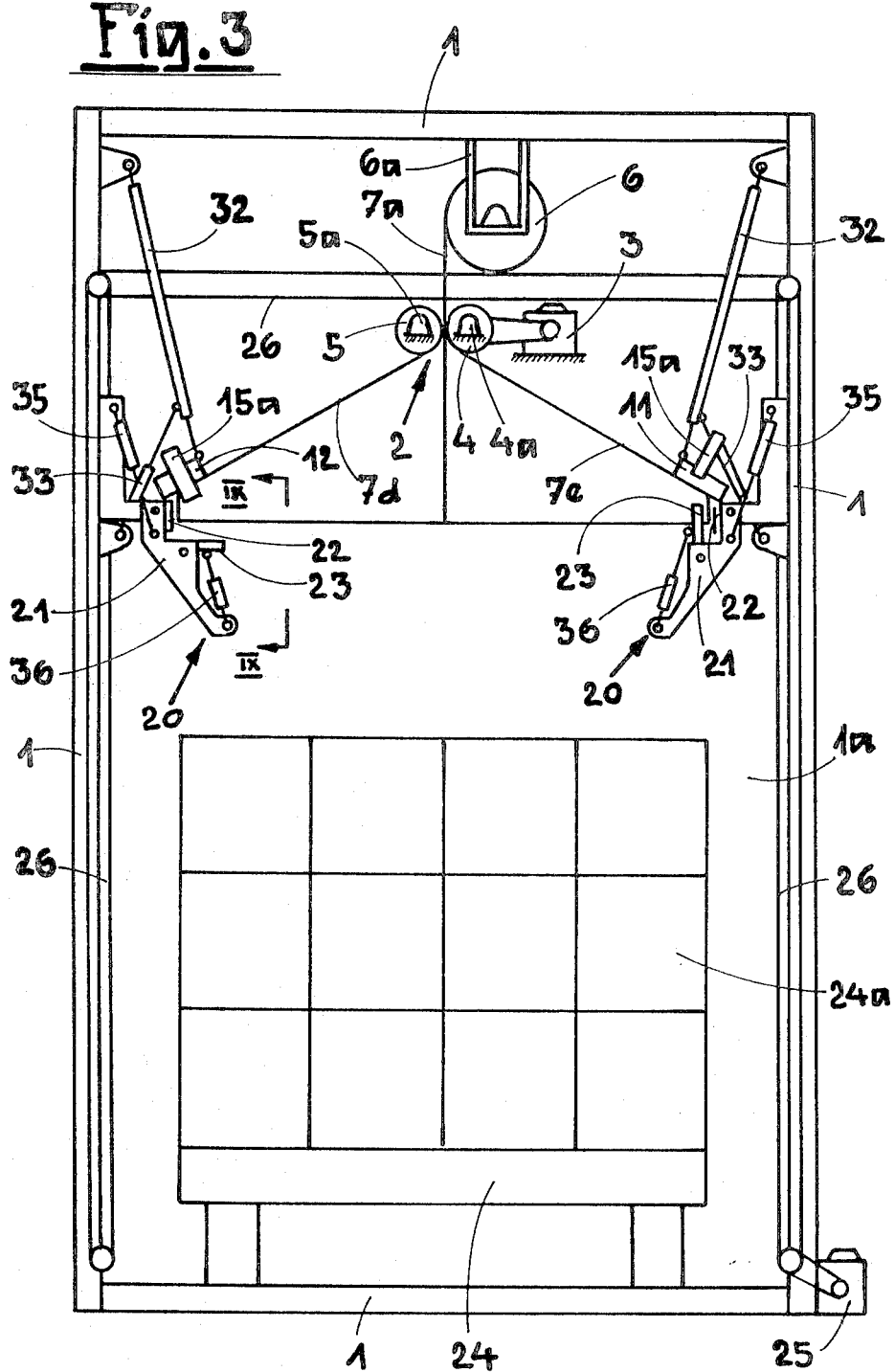

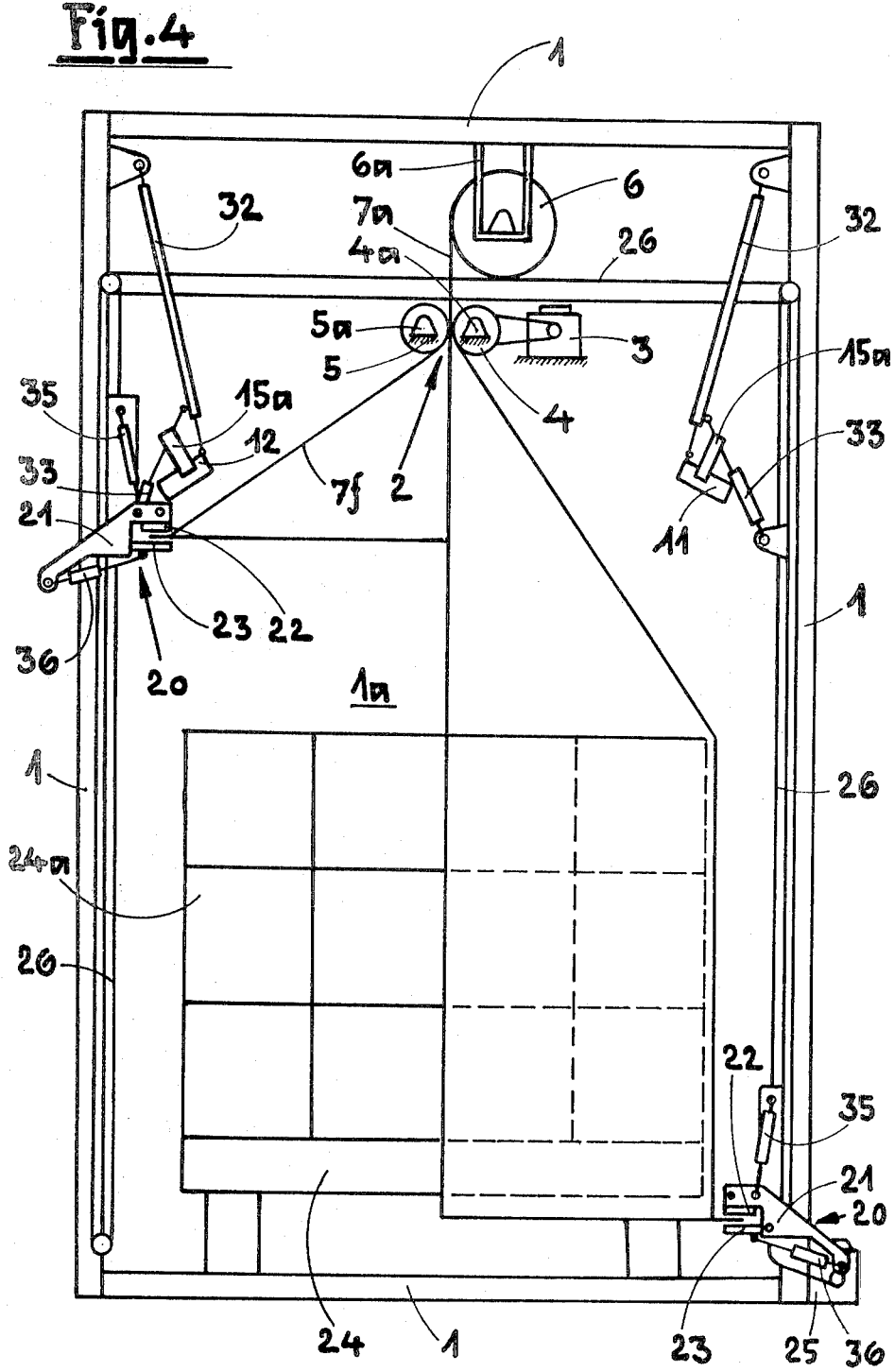

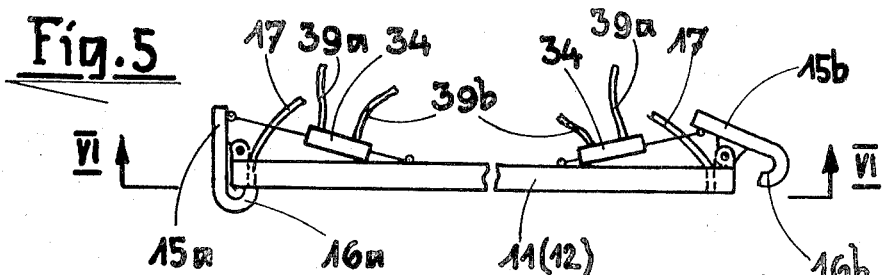
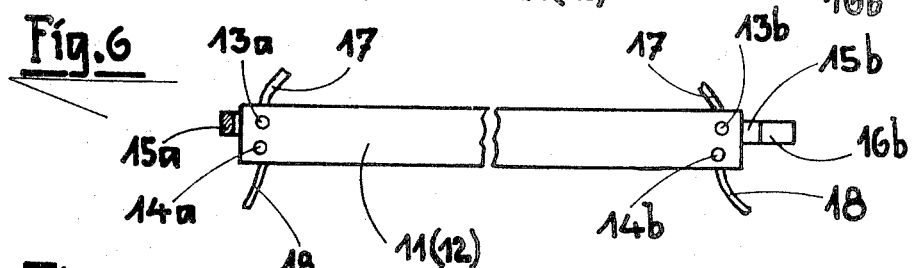
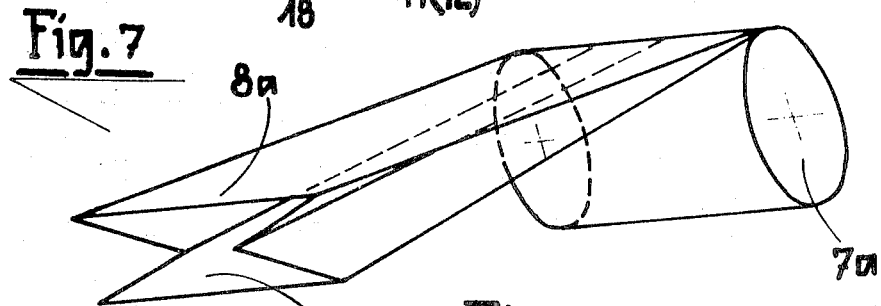
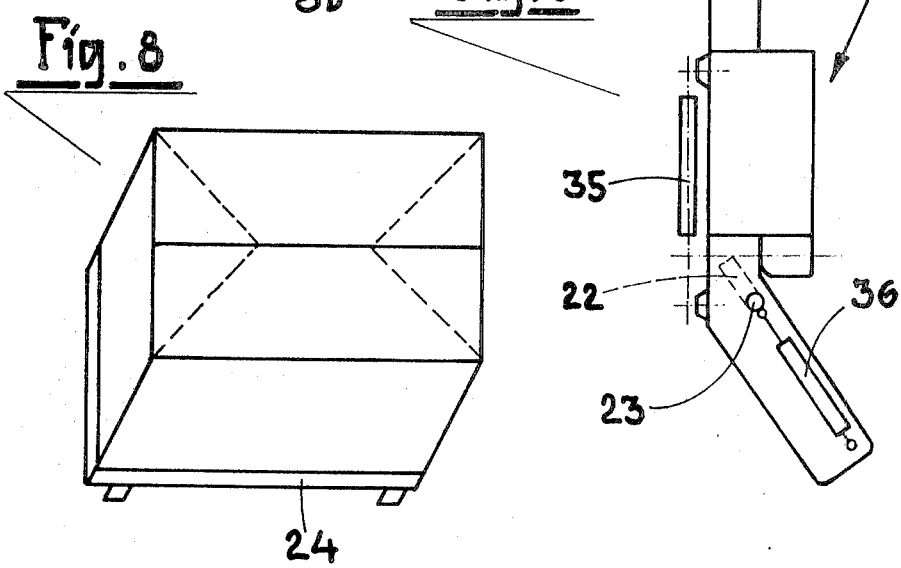

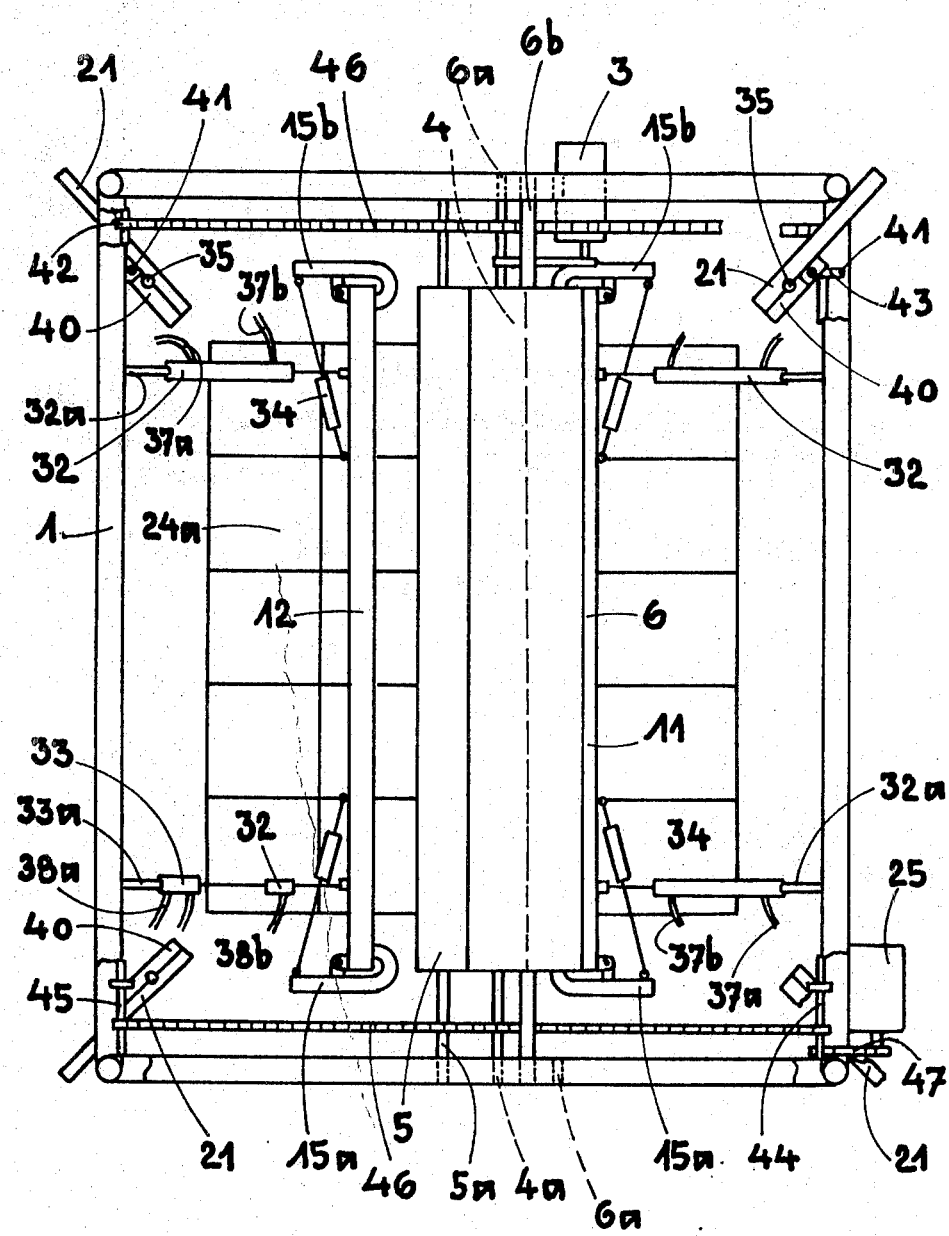

3,621,638
APPARATUS FOR COVERING PALLETS WITH
TUBULAR SHAPED FOIL OR SHEETING
Diethelm Groeke, Schnieglinger Strasse 132,
Nuremberg, Germany
Filed Dec. 9, 1969, Ser. No. 883,436
Claims priority, application Germany, May 9, 1969,
P 19 23 672.7
Int. Cl. B65b 1/02
U.S. Cl. 53—386
17 Claims

ABSTRACT OF THE DISCLOSURE

Apparatus for applying a flattened foil tube particularly of shrinkable foil over a loaded pallet supported on a frame in which the flattened tube is fed to units movably connected with the frame for movement toward and away from the fed tube, with such units having suction air inlets and clamping means operable so that the tube is initially separated or pulled apart by the suction air action on opposite surfaces of the tube after which the clamping means functions to clamp the tube and further separate the tube with the air suction inlets being inactive and further gripping means movable toward and away from the units being effective to grip the thus separated tube and after inactivation of the clamping means move the tube to a position covering the loaded pallet.

BACKGROUND OF THE INVENTION

The present invention relates to apparatus for drawing a flattened foil tube, particularly a shrinking foil, over a loaded pallet.

It has been known to cover goods stacked on pallets with a tubular type foil for securing the goods for transportation and for attaching the foils to the pallet. For this purpose, so called shrinking foils are employed which shrink under the influence of heat and thereby firmly enclose the stacked goods and if need be together with the pallet.

The present invention is to provide an apparatus with which it is possible to accomplish by a machine the covering of a loaded pallet by drawing a foil thereover.

SUMMARY OF THE INVENTION

According to the invention, the desired ends are accomplished by means of a frame having a space for the reception of a loaded pallet and a feed mechanism for a flattened tube firmly supported on the top of the frame above the space by means of units located below the feed mechanism movably connected with the frame for movement toward and away from the flattened tube. Tht units are provided with suction air inlets and clamping elements, with the suction air inlets serving merely for the initial separation of the tube by the action of the air on the apposite surfaces of the tube and the clamping elements being operative for effecting the clamping and final substantially complete separation of the tube and further units movable upwardly and downwardly on opposite sides of the frame relative to the first mentioned units for gripping the substantially completely separated tube and pulling the completely stretched tube to the lower area of the space about the loaded pallet.

By virtue of the mechanical holding of the tube upon its initial separation by the clamping elements, it is assured that tht tube cannot peel off from the structural elements of the movable devices which continue to separate the tube so that it is unnecessary to immediately interrupt the operating cycle.

In order that a separating or welding arrangement will separate or weld the tube at the location corresponding to the proper level of the pallet, a photoelectric scanning device, for example, can be provided for the pallet level for activating the two devices at the proper moment. After the separation, care must be exercised that the separating edge of the tube supply can be properly grasped during the next operating step by the two units for the separation of the tube and for this purpose another photoelectric scanning element can be provided for the control of such movement, that is to say, for its deactivation.

In a special embodiment, transparent tubes may have opaque strips at distances corresponding to the height of the pallet for the interruption of the light ray of the photoelectric cell.

Further objects and advantages of the present invention will become more readily apparent to persons skilled in the art from the following detailed specification and annexed drawings, and in which drawings:

BRIEF DESCRIPTION OF THE DRAWINGS

FIGS. 1–4 are diagrammatic views of an apparatus according to the present invention in which the left-hand side and the right-hand side of each figure illustrates different operating positions, FIG. 5 is a view taken along the line V—V in FIG. 1, the view looking in the direction of the arrows and being on an enlarged scale, FIG. 6 is a view taken along line VI—VI of FIG. 5, the view looking in the direction of the arrows, FIG. 7 is a view in perspective illustrating a slightly separated tube, FIG. 8 is a view in perspective of a pallet having a stack of piece goods thereon covered with a tubular shaped foil or sheeting by means of the present apparatus, FIG. 9 is a view taken along the line IX—IX of FIG. 3, the view looking in the direction of the arrows and being on an enlarged scale, and FIG. 10 is a view taken along the line X—X of FIG. 1, the view looking in the direction of the arrows.

DETAILED DESCRIPTION OF THE INVENTION

Figure 1:
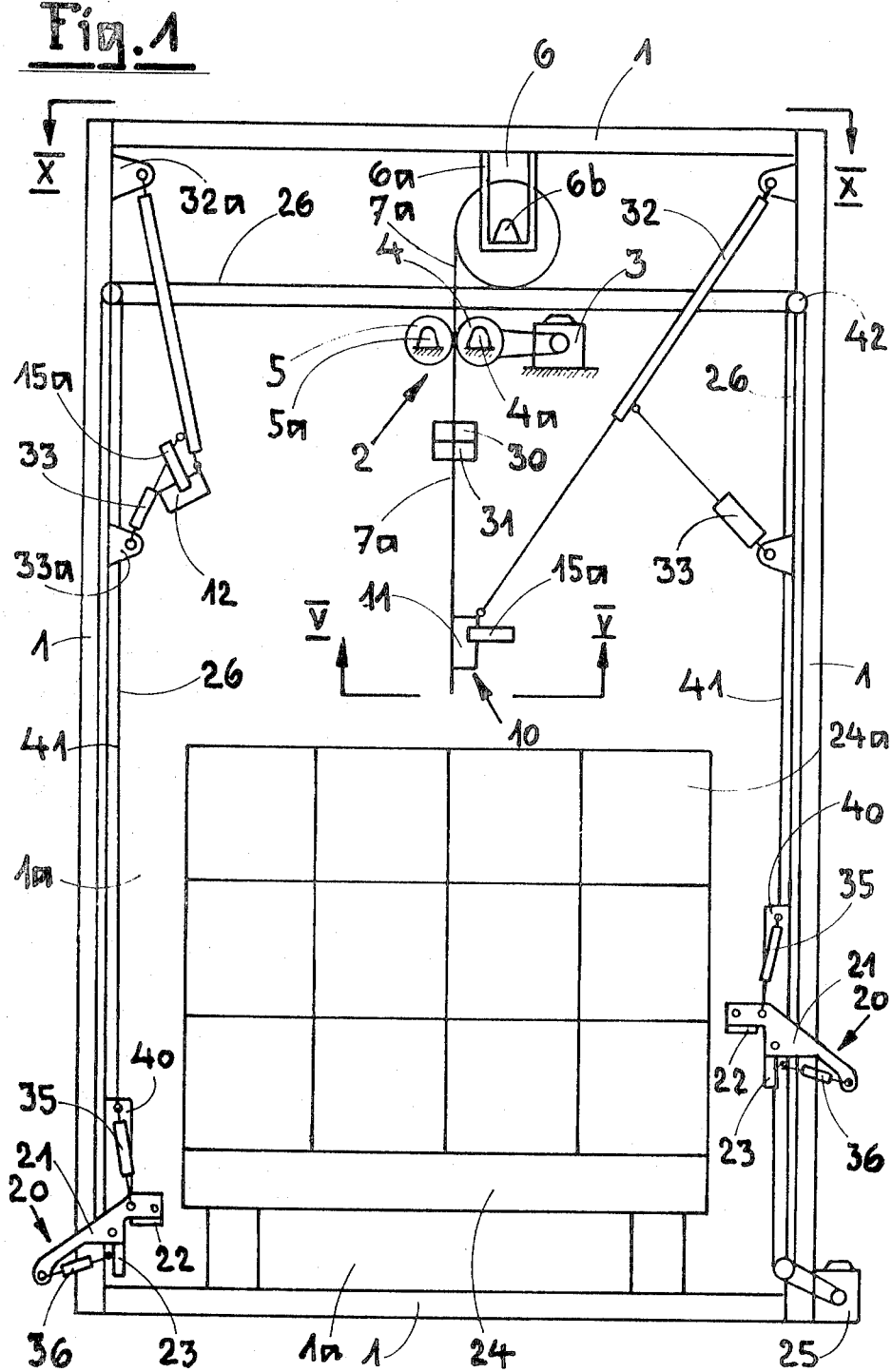

It will be seen in FIGS. 1 and 10 that the apparatus includes a frame 1 which is provided with a space 1a on the bottom thereof and above which space 1a is firmly disposed a feed mechanism denoted generally 2. The feed mechanism 2 is rigidly connected with the frame 1 by means of supports (not shown).

In its simplest form, the feed mechanism 2 includes an electric motor 3 drivingly coupled to a carrier roller 4 having an axle or shaft 4a journalled in the frame and a feed roller 5 provided with an axle or shaft 5a also journalled in the frame. A supply roller 6 for a tubular shaped flattened foil 7a is mounted in the frame by means of supports 6a and an axle or shaft 6b above the feed mechanism 2 and in the following description, the foil will be referred to as a tube.

A device denoted generally 10 which can be swung relative to the frame 1 is located below the feed mechanism 2. The device 10 serves merely for the initial separating or pulling apart of the tube 7a by means of suction air acting upon opposite tube surfaces 8a or 8b (FIG. 7) and is disposed for the subsequent clamping of the tube 7b separated in such a manner and for the purpose of the final substantially complete separation of the clamped tube 7c.

More specifically, the device 10 includes right-hand and left-hand units 11 and 12 which are similar and, as can be seen in FIGS. 5 and 6, the units are provided at the two outside ends of the side facing the tube with suction air inlets 13a, 14a, or 13b, 14b, arranged in pairs. Moreover, each unit is provided with two clamping levers 15a and 15b which are capable of swinging movement about the outside ends of the units so that clamping projections 16a or 16b thereof can be located against at least one of the air inlets 13a, 14a or 13b, 14b. The levers 15a can be moved after the initial separation of the tube 7a from their inactive or inoperative position into their operative position. The air inlets 13a and 13b or 14a and 14b are associated with suction air conduits 17 and 18 as clearly depicted in FIGS. 5 and 6. The units 11, 12 of the device 10 can be swung around the axle 4a, 5a of the roller 4 or roller 5 within the frame 1 and at the same time this movement is effected approximately on a circular arc around the axles 4a, 5a.

For shortening unnecessarily long swinging paths or swinging periods, the units 11, 12 for the initial separation of the tube 7a can be operated synchronously. In other words, such units can be disposed movably at the sides 8a, 8b of the flattened tube and provided each time with at least two air inlets 13a, 13b, 14a, 14b and this is recommended since, as a general proposition, the pallets are developed synmmetrically to at least one axle.

The suction air inlets may per se be related to a common suction air circuit but for practical purposes, in lieu of each individual inlet two such inlets lying closely adjacent each other have been provided which are operably related to two separate air circuits for improving the aspirating effect desired. It should be pointed out that two separate suction air circuits or conduits are advantageous in that upon the failure of one circuit, for example, due to aspiration of infiltrated air, at least the other circuit will be effective upon the tube in the desired manner.

In order to make it possible to effect a separation of the flattened tube adapted as far as feasible to the particular shape of the pallet, the distance between the suction air inlets, disposed individually or in pairs, will exceed the length of the relevant side of the pallet, at the most by the measure of shrinking, resulting proportionately for this side from the particular circumference or peripheral extent of the tube employed and the pallet to be covered. As a consequence, the flattened tube will be separated or pulled apart and drawn over the pallet in such a manner that in case of a shrinkage of the foil to be effected subsequently, the latter can shrink along the entire periphery of the tube to an equal degree and hence no locations of a particularly high shrinking tension can develop.

For avoiding, during the moving of the units 11, 12, the development of undesired tensions in the longitudinal direction of the tube, it will be noted that the two units can be moved, preferably precisely, about a circular arc around the axle 4a, 5a located on the same side of the tube 7a. It should further be mentioned that by virtue of the levers 15a, 15b, any likelihood of the tube possibly dropping from the air inlets due to low suction forces is overcome and for practical purposes the clamping levers are operated synchronously and after the initial separation of the flattened tube can be moved from their inoperative position into their operative position.

It will also be noted that the mechanism 20 has been provided in what may be termed the outlet direction of the device 10 and such mechanism includes four gripping tongs 21 (FIGS. 1 and 10). Each tong 21 includes a fixed blade 22 and a pivotable blade 23 and each of the blades 23 can be displaced diagonally in view of the outline of a pallet 24 loaded with parcels or packages 24a, which is adapted to be enclosed with the tube and left within the frame 1. In addition, each tong 21 can be swung or moved through an angle of 90° with respect to the frame 1 about a horizontal axis. The adjustment in the heightwise direction of the tongs 21 is effected via a gear chain drive 26 driven by an electric motor 25 and by means of which all of the tongs 21 are connected with one another.

In a special situation, the mechanism 20 including the four tongs 21 can be brought forwardly by the units 11, 12 which serves, inter alia, for the substantially complete separation of the clamped tube 7c, upon reaching the zone assumed upon a substantially complete separation, in such a fashion that for each tong 21 one of the blades 22 will be located substantially perpendicular to the exterior of the tube 7d and the blade 23 approximately horizontal, preferably directly below the edge of the tube; in other words, in an inoperative position, and the blade 23 carrying the tube 7d being capable of being moved from the inside of the tube towards the blade 22 or into the operative position. The tube, which during the substantially complete separation step had been held firmly mechanically, will in the succeeding process continue to be held mechanically whereby any loss during the process of pulling or drawing the tube over the loaded pallet is prevented in a very simple manner.

Otherwise, through a further essential characteristic, namely the fact that the blades 23 are displaced diagonally with respect to the base surface of the pallet 24 which happens to be in an imaginary horizontal plane in the space 1a, a tightening of the tube 7e will be realized so that the opening formed by an edge area of the tube will be forced open as far as is possible.

In order to improve the mechanical holding of the tube during the pulling or embracing process over the loaded pallet 24, the blades 23 together with the blades 22 can be displaced by approximately 90° with respect to the frame 1 in a perpendicular plane upon taking over the tube 7e and while maintaining their operative position, in such a fashion that the blades 22 will point or extend toward the tube 7e. The resistance which must be overcome when withdrawing the tube from the closed gripping tong being in such position is so great that in all probability such will not occur during the operation of the apparatus.

The tongs 21 while maintaining their position in displacement with respect to the frame 1 and their operative position can be lowered on the frame 1 in parallelism to each other. To release the tube which has been drawn or pulled over the loaded pallet 24, the movable blades 23 can be returned to their inoperative position upon maintaining the lowest position of the tongs 21 on the frame and while maintaining the tong position as displaced relative to the frame 1. To avoid unnecessary and time consuming reversals, provision has been made for the tongs 21 to be raised on the frame 1 while maintaining the position after displacement relative to the frame and while maintaining the inoperative position of the blades 23 which can be displaced in parallelism to each other.

Moreover, to shorten the operating time, the displacement of all of the blades 23 relative to the blades 22 or the displacement of all of the tongs 21 relative to the frame 1 can be effected each time synchronously. In addition, all tongs 21 are, as previously indicated, connected to one another via the chain drive 26 driven by the motor 25 which means that a single motor is sufficient for the lowering and raising of the tongs and assures their even movement.

Intermediate the feed mechanism 2 and the device 10 for merely the initial separation of the tube, a separating and welding arrangement 30 and 31 is provided and attention is respectfully invited to FIG. 1.

The displacing movement of the units 11 and 12 and their clamping levers 15a and 15b, together with the swinging movement of the tongs 21 and their blades 23, are effected by hydraulically operable piston-cylinder units denoted generally 32–36.

With reference to FIG. 10, it will be noted that for each of the units 11, 12 there is provided upper and lower piston-cylinder units 32 and 33 respectively arranged in pairs. Each of the units 32 is movably connected with a fitting 32a provided for the frame 1 and with one of the units 11, 12, respectively. Each of the piston-cylinder units 33 is connected movably with a connection 33a provided for the frame 1 and with the upper piston-cylinder unit 32 disposed thereabove respectively. Flexible hoses or conduits 37a, 37b, are in communication with the respective ends of the cylinder of each piston-cylinder unit 32 for the supply and discharge of the hydraulic medium and similar hoses 38a, 38b communicate with the cylinders of the units 33. As perhaps best shown in FIG. 5, piston-cylinder units 34 are operably connected to the clamping levers 15a, 15b and swivelably and movably engage the units 11, 12. Here again, flexible hoses 39a, 39b communicate with the respective ends of the cylinders of the unit 34 for suplying and discharging the hydraulic medium.

It will further be noted in FIG. 10 that adjacent each corner of the frame 1 a gripping tong 21 has been disposed. Each tong 21 is pivotally attached to a cradle 40 located on a perpendicularly movable endless chain 41 which is guided at the top over a wheel 42 and below over a wheel 43. The upper wheels 42 located on the side of the unit 11 are mounted on a common axle or shaft 45 while the lower wheels 43 located on both sides of the unit 12 are mounted on a common axle 44. The axles 44 and 45 are connected by means of two endless chains 46. The lower wheels 43 are mounted on common axles whereby the axle located on the unit 11 is driven by the motor 25 by means of an endless chain 47. The piston-cylinder unit 35 serves for the displacement of the tong 21 and such unit is operably connected with the tong 21 and with the cradle 40. The piston-cylinder unit 36 is employed to displace the blade 23 attached movably on the tong 21 and the unit 36 engages the blade 23 and the tong 21 respectively. Flexible hoses for the supply and discharge of the hydraulic medium (not illustrated) communicate with the cylinder of each unit in proximity to the ends thereof.

From the foregoing, it will be noted that a particularly compact construction and an extremely reliable operation has been realized by reason of the fact that the tube was flattened originally in such a fashion that the surfaces of sides 8a, 8b are disposed so as to be doubled up to approximately half the length of the side or surface between the two tube areas intended for the other two sides of the pallet.

It should be borne in mind that reference has been made to a tube which has been perforated transversely at spaced intervals relative to its longitudinal direction, that is to say in correspondence to the height of the pallet, and which has been welded in the direction of pull or separation in front of the perforation so that separation of the tube can be realized by the fact that the roller 4 upon feeding a length of tube sufficient for the particular height of the pallet will be blocked in the lowest position on the frame of the pallet during the further lowering of the device 20 for pulling the hose 7f over the pallet 24. The portion of the tube which has been pulled or drawn over the pallet will be torn from the remaining tube supply under the action of the blocking of the feed roller.

A loaded pallet covered with a tube by means of the device is shown in FIG. 8. In this pallet, as can be seen in the straightness of its lines, the shrinkage under heat of the foil, which is to be carried out subsequent to the covering, has already been accomplished.

Since pivotable components are related to the above-described apparatus, to which on their part constructional elements which are movable in a straight line or pivotable, it is recommended that the pivotable movements, and preferably all movements, be accomplished via the hydraulically operating piston-cylinder units 32–36. In addition, such a development is particularly recommended since then all of the cylinders and pistons and the motors 3, 24 can either be activated or inactivated automatically in a simple fashion by a single control so that at the latest, upon the termination of a partial operating stroke, the next operating stroke will be introduced. In contrast to mechanical control installations provided with relatively complex movement mechanisms, such a regulating or control arrangement merely requires simple multi-way valves.

It should further be noted that the units 11, 12 and the gripping tongs 21 which can be caused to act upon the tube, may be developed so that the same can be adjusted to various tube widths. By "tube width" reference is made to the determinable extent of the tube between the air inlets 13a, 14a or 13b, 14b of one and the same unit.

Figure 2:
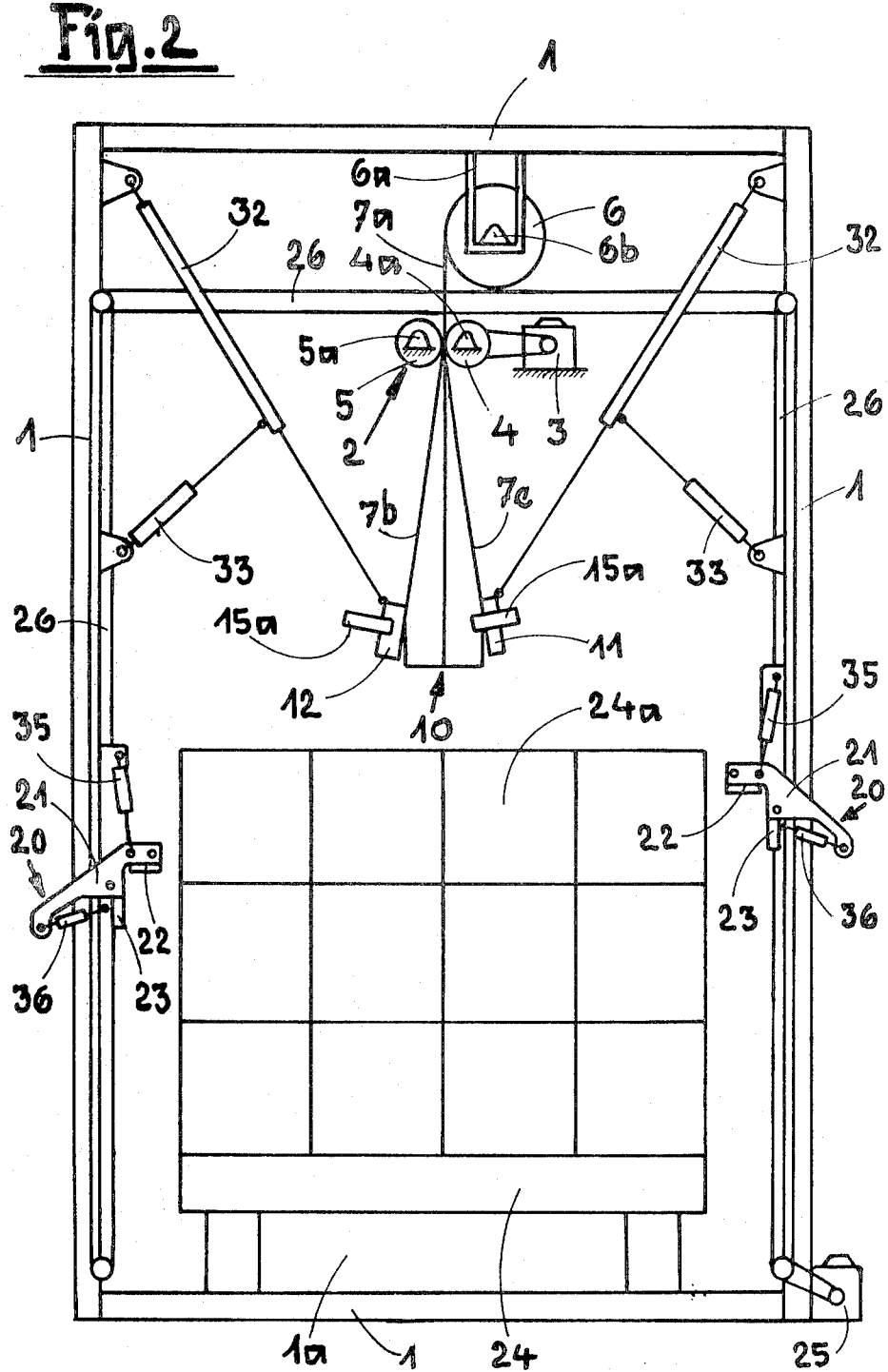

The apparatus operates as follows:

Prior to starting the apparatus, the individual parts thereof are in the position with respect to frame 1 as shown at the left-hand side of FIG. 1. As soon as the flattened tube 7a has been introduced by means of the feed mechanism 2 to such a point that the units 11 and 12 can grasp the hose 7a therebetween upon the movement of such units into the position shown at the right-hand side of FIG. 1, both units move into such position. Immediately thereafter, the air circuits 17 and 18 become operative and the tube surfaces 8a and 8b are drawn into the air inlets 13a, 13b and 14a, 14b. Then, the units 11 and 12 are swung into the position illustrated at the left-hand side of FIG. 2 and the levers 15a and 15b together with the projections 16a and 16b are swung to fit the air inlets 13a, 13b, 14a and 14b, and attention is directed to the right-hand side of FIG. 2. By virtue of the displacement of the projections 16a and 16b, the clamped tube 7c will be held mechanically in order that the circuits 17 and 18 can be inactivated.

Subsequently, the units 11 and 12 are moved to their initial or starting position as viewed in the left-hand side of FIG. 3 and during the entire process above-described, the tongs 21 are moved gradually from their starting position (the left-hand side of FIG. 1) into the immediate vicinity of the units 11 and 12 as shown at the left-hand side of FIG. 3. In this position of the tongs 21, the blades 23 are displaced diagonally through the interior of the tube and are caused to fit against the fixed blades 22. At the same time, the levers 15a and 15b are moved backwardly so that the tube 7d, which previously had been separated substantially completely, will be separated completely and thus held tightened in the tongs 21 (right-hand side of FIG. 3) as tube 7e.

The tongs 21 together with the tube 7e held in the manner described above, are swung about a horizontal axis by 90° into a position as illustrated at the left-hand side of FIG. 4. At the same time, the hose 7e will assume the position with respect to the frame 1 as denoted 7f in FIG. 4. While maintaining their position relative to the frame 1, the tongs 21 are subsequently lowered and will reach the lowest position on the frame as illustrated at the right-hand side of FIG. 4. In this position, the blades 23 are swung backwardly so that the tube, which by this time has been pulled completely over the pallet 24, will be released so that the apparatus, after the tube has first been closed, following passing through a length of tube corresponding to the height of the pallet, will be sealed by the welding device 31 and subsequently severed such as, for example, by the separating device 30. The apparatus will now be ready for the next pallet covering operation.

Of course, it should be pointed out that in lieu of the above-described hydraulic operation of the tongs, the blades, the units for separating the tube and the clamping levers, a pneumatic, electric or mechanical assemblage can also be utilized within the scope of the invention. In addition, the adjustment heightwise of the gripping tongs with respect to the frame can also be accomplished by other means such as by way of hydraulically operated means.

I claim:

1. An apparatus for pulling a flattened foil tube particularly of shrinkable foil over a loaded pallet, including a frame having a space for the reception of a loaded pallet, a feed mechanism for the flattened tube firmly mounted on top of the frame above the space, at least two units having suction air inlets and clamping means, means mounting said units on said frame below said feed mechanism for inward and outward movement relative to opposite surfaces of said flattened tube, said air inlets of each unit facing the opposite sides of the tube and said clamping means being movable into clamping engagement with the side of each unit facing the opposite surface of the tube, further units having gripping means mounted on opposite sides of the frame below said two units for upward and downward movement on the frame, means for applying suction to said air inlets when said two units have been moved inwardly in proximity to the flattened tube whereby the opposite surfaces of the tube are subjected to suction for effecting an initial separation of the tube, the outward movement of said two units arresting the suction and actuating the clamping means to grip the opposite surfaces of the tube and substantially completely separate the tube during such outward movement, and means for causing the gripping means of said further units to grip said opposite surfaces of said tube for tightening said separated tube and pulling said tightened tube over the loaded pallet located in said space.

2. The apparatus for pulling a flattened foil tube over a loaded pallet as claimed in claim 1 in which said feed mechanism includes a carrier roller, a motor for driving said carrier roller and a feed roller arranged in parallelism to said carrier roller for pressing the carrier roller against the flattened tube.

3. The apparatus for pulling a flattened foil tube over a loaded pallet as claimed in claim 1 in which said two units are operable synchronously, with each unit being provided with at least two suction air inlets.

4. The apparatus for pulling a flattened foil tube over a loaded pallet as claimed in claim 2 in which said carrier roller and feed roller each have an axle journalled in the frame, with said axles being on opposite surfaces of the tube, and each of said two units being movable about a circular arc around the axle located on the opposite surface of said tube.

5. The apparatus for pulling a flattened foil tube over a loaded pallet as claimed in claim 1 in which the clamping means of each of said two units can be moved against one suction air inlet of the unit for an intermediate gripping of the tube, and means for operating said clamping means simultaneously.

6. The apparatus for pulling a flattened foil tube over a loaded pallet as claimed in claim 1 in which said further units include four body members located at each corner of the frame, each body member including a substantially perpendicular gripping blade located exteriorly of the tube and a substantially horizontal second gripping blade located below the edge of the tube in its inoperative position and means for displacing said second gripping blade inside of said tube towards said first mentioned gripping blade for gripping the opposite surface of the tube therebetween.

7. The apparatus for pulling a flattened foil tube over a loaded pallet as claimed in claim 6 in which said second gripping blades can be displaced diagonally relative to an imaginary horizontal surface in the space of the frame for tightening of the tube.

8. The apparatus for pulling a flattened foil tube over a loaded pallet as claimed in claim 6 including means mounting each body member for movement about 90° in a perpendicular plane when the second gripping blade has been displaced to cooperate with the first main blade to grip the opposite surface of the tube whereupon the first mentioned gripping blade assumes a substantially horizontal position in the direction of the tube.

9. The apparatus for pulling a flattened foil tube over a loaded pallet as claimed in claim 6 in which said further units can be lowered in parallelism to each other on the frame while said first and second gripping blades maintain their position gripping the opposite surfaces of the tube.

10. The apparatus for pulling a flattened foil tube over a loaded pallet as claimed in claim 6 in which said second gripping blades upon reaching the lowest position of said further units on the frame are displaced into their inoperative position.

11. The apparatus for pulling a flattened foil tube over a loaded pallet as claimed in claim 6 in which said further units can be moved upwardly in parallelism to each other on the frame while maintaining said second gripping blades in the inoperative position.

12. The apparatus for pulling a flattened foil tube over a loaded pallet as claimed in claim 6 including means for synchronously displacing said second gripping blades of said units.

13. The apparatus for pulling a flattened foil tube over a loaded pallet as claimed in claim 6 in which a gear chain drive interconnects all said further units and a motor drives said chain drive.

14. The apparatus for pulling a flattened foil tube over a loaded pallet as claimed in claim 2 in which upon the feeding of a tube length sufficient for the pallet to be covered, the carrier roller is blocked during the further lowering of the further units for pulling the tube over the pallet.

15. The apparatus for pulling a flattened foil tube over a loaded pallet as claimed in claim 1 including separating and welding means for the tube located between said feeding mechanism and said two units.

16. The apparatus for pulling a flattened foil tube over a loaded pallet as claimed in claim 1 in which the inward and outward movement of said two units, the actuation of said clamping means and the gripping means of said further units being effected by fluid operated piston-cylinder assemblies.

17. The apparatus for pulling a flattened foil tube over a loaded pallet as claimed in claim 1 in which said tube was originally flattened so that the areas thereof for opposite sides of the pallet each has been doubled to half the length of the sides and disposed between the two areas of the tube for the other two sides of the pallet.

References Cited

UNITED STATES PATENTS

| | | | |
|---|---|---|---|
| 3,112,586 | 12/1963 | Luetzow | 53—256 X |
| 3,210,909 | 10/1965 | Cochrane | 53—256 |
| 3,025,649 | 3/1962 | Stuhlman | 53—182 X |
| 3,429,095 | 2/1969 | Huson | 53—24 |
| 3,522,688 | 8/1970 | Kaliwoda et al. | 53—30 |
| 3,508,375 | 4/1970 | Myers | 53—30 |
| 2,950,589 | 8/1960 | Litchard | 53—386 X |

THERON E. CONDON, Primary Examiner

H. M. CULVER, Assistant Examiner

U.S. Cl. X.R.

53—184